UNITED STATES PATENT OFFICE 2,626,239

DRILLING FLUIDS AND METHODS OF USING SAME

Cary R. Wagner, Utica, Ohio, William N. Axe, Bartlesville, Okla., and Chester M. Himel, Palo Alto, Calif., assignors to Phillips Petroleum Company, a corporation of Delaware No Drawing. Application July 28, 1949, Serial No. 107,394

12 Claims. (Cl. 252—8.5)

This invention relates to drilling fluids. In one of its more specific aspects, it relates to a drilling fluid comprising solutions (and by "solutions" we mean to include dispersions and suspensions) of cellulose which are not precipitated nor regenerated in any substantial degree by dilution with water or the usual dilute salts contained in the connate water of an oil well formation or by the heat or cold generally obtainable in a well. In another specific aspect, it relates to a drilling fluid comprising sulfonated cellulose derivative. In still another specific aspect, it relates to the methods of using such celluloses for controlling viscosity, gel strength, water loss and filter cake thickness of oil well drilling fluids.

This application is a continuation-in-part of our copending application, Serial No. 626,895, filed November 5, 1945, now abandoned.

In the art of drilling wells, especially drilling wells by the rotary method, it is necessary to use a drilling mud or drilling fluid, as is well understood in the art. The drilling mud lubricates the drill stem, carries the cuttings to the surface of the well, cools the drill bit, and forms a filter cake on the walls of the well to prevent the loss of at least any substantial amount of water from the drilling mud to the natural formations of the well. In order to perform these important functions properly, the drilling mud must have suitable viscosity and other thixatropic properties at all times.

The principal object of our invention is to produce a drilling mud which can be used in substantially all formations with reduced water loss, thin filter cake, and proper viscosity and gel strength.

Another object of our invention is to provide an improved drilling fluid.

Still another object of our invention is to provide an improved method of drilling.

Another object is to provide a drilling mud additive suitable for imparting proper viscosity, gel strength, water loss, and filter cake thickness to well drilling fluids.

Another object of our invention is to provide a drilling mud containing a soluble (which includes dispersible and suspendable) sulfonated cellulose derivative which is not precipitated or regenerated in any substantial degree by dilution with water or by contact with electrolytes normally encountered in drilling.

Numerous other objects and advantages of this invention will be apparent to those skilled in the art upon reading the accompanying specification and claims.

To obtain these objects of our invention, we use in the drilling mud a sulfonated cellulose derivative. More specifically, we use those cellulose derivatives which may be regarded structurally as being salts of cellulosealkane-, cellulosebenzene-, or cellulosealkylbenzenesulfonic acids. These may be prepared by the reaction of cellulose with a halogenalkanesulfonic acid such as betachloroethanesulfonic acid, a chlorobenzenesulfonic acid, and an alpha-chloroalkylbenzenesulfonic acid such as alpha-chlorotoluenesulfonic acid. The salts are the addition products of free acid and the water soluble sulfonated cellulose derivative. These compounds are characterized by the typical sulfonate linkage:

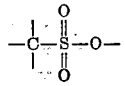

wherein S is sulfur, O is oxygen, and C is carbon.

In celluloseethanesulfonic acid, the typical linkage appears as follows:

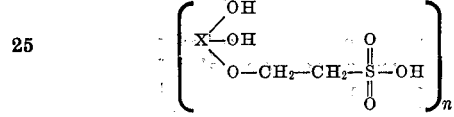

Our cellulose is not precipitated or regenerated by dilution with water and/or the usual salt contained in connate water. It is not precipitated by heat or cold generally obtainable in a well, nor is it regenerated during use as a drilling fluid by aging or ripening. It is a substantially stable substance for relatively long periods of time. Substances which precipitate or regenerate under the above conditions are not suitable for use in drilling mud, although they may find some use as plugging agents for plugging wells. Therefore, they are not related to the present invention. Such plugging agents would soon precipitate and fill the mud pit and also choke the drill stem in the hole if used as a drilling fluid.

The exact amount of water soluble sulfonated cellulose derivative employed is not critical as even small amounts give a correspondingly small effect. These sulfonated cellulose derivatives may be prepared by many methods known to the art. The type formula for sulfonated cellulose derivatives of the above acid is:

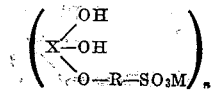

where X is the glucose residue (C$_6$H$_7$O$_2$); R is an alkylene radical, such as a methylene (—CH₂—), ethylene (—CH₂CH₂—), or 1,3-propylene (—CH₂CH₂CH₂—) radical, an alpha-alkarylene radical, such as a benzylene

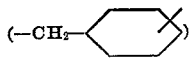

alphamethylbenzylene

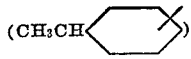

or alphaethylbenzylene

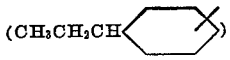

radical, or an arylene radical, such as a phenylene radical, and M is an alkali metal, an alkaline earth metal or ammonium group, and $n$ is an integer. Other metal ions which form water soluble salts of the sulfonated cellulose may be used.

The degree of substitution is the average number of substituents per glucose residue. The average number of substituents in each unit of the cellulose derivatives should be sufficient to make the molecule water soluble. In general, the degree of substitution should be above 0.2 and may be as high as 3.0. However, complete substitution is not necessary. The additional expense of producing a completely substituted product is not warranted by the additional benefits gained over the water soluble, lower-substituted material.

The number of these indicated functional groups introduced into the cellulose is variable, depending on reaction conditions, and the variation will change the properties of the product to a certain degree. Only one functional group is indicated in the formula shown, but some X units may have all hydroxyl hydrogens replaced while others may have none.

The sulfonated cellulose derivatives may be employed as free acids or in the form of the alkali metal, alkaline earth metal and ammonium salts. On a free acid basis the quantity of these derivatives added to the mud may vary from about 0.1 to 2 or more pounds per barrel of conventional aqueous drilling mud composition, but obviously more or less may be employed with some value.

Our sulfonated cellulose derivative combines the beneficial effect of other soluble cellulose derivatives on drilling muds with increased compatibility to conditions tending to accelerate the flocculation of the drilling mud colloids such as water of low pH, high salt content, or deleterious polyvalent cations such as barium, calcium, aluminum and others.

Any use of the sulfonated cellulose derivatives described herein to be retained in the mud throughout the entire normal life of the drilling mud is not to be confused with the use of some cellulose which is to be precipitated as an insoluble plugging agent in the formation. Our cellulose derivatives are substantially stable to heat, cold, aging, ripening, dilution by water, and contamination by salts of connate water. Their use is not to be confused with plugging agents which are deliberately precipitated by such heat, cold, aging or dilution. We do not use our cellulose as a plugging agent. While minor reactions in the well may form a colloidal haze of supposedly insoluble cellulose and while this colloidal cellulose may contact the formation, such minor traces of insoluble colloidal material is not comparable to the immediate precipitation of relatively massive amounts of insoluble plugging material. Drilling muds containing our cellulose derivatives in the amount used (which may be about 4 pounds of cellulose per barrel of mud) are not subject to injury to any detrimental degree by the concentration of salt of the usual connate waters.

While we have found that the most satisfactory cellulose derivatives are those in which the alkylene portion of the functional group R contains 3 or less carbon atoms, the derivatives in which R contains more than 3 carbon atoms have varying degrees of usefulness.

Such drilling muds containing cellulose derivatives described herein often have low initial gel strengths, which allows gas bubbles to come out of the drilling mud so rapidly that the drilling mud will not become gas cut. Elimination of gas cutting reduces the chances of blowouts. Our drilling muds are often characterized by a relatively thin filter cake and by small water loss. This is very useful in avoiding loss of water to the formation, as well as the resultant swelling or caving of the formation which occurs with some formations. Our muds do not generally ferment or spoil.

The effectiveness of our sulfonated cellulose derivatives as mud-control agents will be more clearly understood from a consideration of the following examples. These are the results of tests which have been performed on the indicated derivatives under the particular conditions described in connection therewith.

EXAMPLE I

Two samples of the potassium salt of cellulose-ethanesulfonic acid having degrees of substitution of 0.4 and 2.4, respectively, were prepared from a high grade chemical cotton and a third sample of the sodium salt of celluloseethanesulfonic acid having a degree of substitution of 1.51 was prepared from wood pulp. Since the material having a degree of substitution of 0.24 was found to give fairly high viscosities, a portion of it was treated with hydrogen peroxide to give a lower viscosity material. This sample of treated material will hereafter be referred to as "modified 0.24." For the sake of simplicity, the material used in these tests will be designated by their respective degrees of substitution. The hydrogen peroxide merely degrades the material by breaking it into shorter cellulose chains. It is still the same material chemically.

EXAMPLE II

The samples of potassium celluloseethanesulfonate were tested in a base mud and comprising 8.1 per cent Ezmix (native clay), 0.8 per cent bentonite, 26.3 per cent barium sulfate, 0.8 per cent barium carbonate, and 64 per cent water. The test procedure was to hydrate the amount of additive required for each test in 50 ml. of water for several hours, then add this volume to 250 ml. of base mud and stir for 30 minutes. The mud composition given above is for the diluted system. These sample muds were agitated for 30 minutes and allowed to stand overnight at room temperature. They were then stirred again and tested for viscosity, gel strengths, water loss, and pH according to procedures outlined in A. P. I. Code 29. The results were as shown in the following table:

Table 1

| Additive, dosage lb./bbl | 0.24 | | | 0.24 (modified) | | 0.40 | |
|---|---|---|---|---|---|---|---|
| | 1 | 2 | 3 | 1 | 3 | 1 | 3 |
| Stormer viscosity, cps | 67.5 | 71 | 100 | 17 | 56.5 | 18.5 | 93 |
| Gel strengths (g.): | | | | | | | |
| Initial | 69 | 30 | 250 | 2 | 15 | 0 | 8 |
| 10 min | 70 | 160 | 300 | 15 | 90 | 10 | 120 |
| Water loss ml./30 min. at 100 p. s. i | 22 | 11 | 11.5 | 22 | 7 | 11 | 5.5 |
| pH filtrate | 9.2 | 9.2 | 9.2 | 9.0 | 9.0 | 8.5 | 8.3 |

EXAMPLE III

The sodium celluloseethanesulfonate having a high degree of substitution of 1.51 prepared from wood pulp was tested in a base mud comprising 20 per cent kaolin, 2 per cent bentonite, 17.5 per cent barium sulfate, and 60.5 per cent water. In each test the required dosage of additive was weighed on the dry basis and added to the mud, which was then stirred on a high speed mixer for at least 30 minutes. The samples were then aged overnight at room temperature and then tested according to the standard procedure. The results were as shown in the following table:

Table 2

| Pounds per bbl | 0 | 1 | 2 | 4 | 6 |
|---|---|---|---|---|---|
| Viscosity, cps | 18 | 24.5 | 36 | 100 | 100 |
| Initial gel strength, gms | 0 | 0 | 0 | 20 | 25 |
| 10 min. gel strength, gms | 5 | 0 | 10 | 80 | 160 |
| Water loss, ml. in 30 min. at 100 p. s. i. | 17 | 13.5 | 10.6 | 6.0 | 4.4 |
| pH | 7.9 | 7.9 | 8.0 | 8.1 | 8.1 |

EXAMPLE IV

A sample of sodium cellulosemethylbenzene-sulfonate having a degree of substitution of 0.205 was prepared by the reaction of chemical cotton with sodium alpha chlorotoluenesulfonate. This material was tested in three different mud systems, the compositions of which are shown in the following table:

Table 3

| Mud designation | Constituents, weight percent | | | | | | |
|---|---|---|---|---|---|---|---|
| | Kaolin | Ezmix | Bentonite | CaSO$_4$ | BaSO$_4$ | NaCl | H$_2$O |
| KB | 20.0 | | 2.0 | | 17.5 | | 60.5 |
| EB | | 6.90 | .69 | .17 | 25.00 | 0 | 67.24 |
| EBS | | 6.08 | .61 | .15 | 21.98 | 12.00 | 59.18 |

The mud designation KB refers to Kaolin-bentonite, EB refers to Ezmix-bentonite, and EBS refers to Ezmix-bentonite-salt.

EXAMPLE V

In each test the required dosage of additive was weighed on the dry basis and added to the mud, which was then stirred for 30 minutes. The samples were allowed to stand overnight at room temperature, after which they were tested for viscosity, gel strength, water loss, and pH according to the standard procedures. The results of these tests were as shown in the following table:

Table 4

| Mud designation | | Sodium cellulosemethyl-benzenesulfonate | | | | |
|---|---|---|---|---|---|---|
| | Pounds per barrel | 0 | 1 | 2 | 4 | 6 |
| KB | Viscosity, cps | 18 | 26 | 32.5 | 43.5 | 6.5 |
| | Initial gel strength, gms | 0 | 0 | 0 | 0 | 5 |
| | 10 min. gel strength, gms | 5 | 20 | 70 | 100 | 120 |
| | Water loss, ml. in 30 min. at 100 p. s. i | 17 | 14.5 | 11.5 | 7.7 | 5.5 |
| | pH | 7.9 | 8.0 | 8.1 | 8.1 | 8.2 |
| EB | Viscosity, cps | 12 | 11 | 10 | 10 | 10 |
| | Initial gel strength, gms | 19 | 12 | 12 | 5 | 0 |
| | 10 min. gel strength, gms | 20 | 12 | 12 | 8 | 7 |
| | Water loss, ml. in 30 min. at 100 p. s. i | 56.5 | 58 | 50 | 37 | 25 |
| | pH | 8.2 | 7.9 | 7.8 | 7.9 | 7.9 |
| EBS | Viscosity, cps | 18 | 10 | 10 | 10 | 12 |
| | Initial gel strength, gms | 12 | 12 | 7 | 10 | 7 |
| | 10 min. gel strength, gms | 30 | 15 | 10 | 15 | 10 |
| | Water loss, ml. in 30 min. at 100 p. s. i | 57.5 | 58 | 53 | 48 | 42 |
| | pH | 7.6 | 7.4 | 7.2 | 7.2 | 7.2 |

It is understood that while a theory of operation has been advanced, it is not the only or necessary one, but has been advanced only to facilitate the disclosure. It is understood, however, that this invention is not limited to any theory of operation or action. It is further obvious that various changes may be made in the details without departing from the spirit of this invention, or from the scope of the invention as defined in the following claims. Obviously, use in aqueous mud laden fluids includes use in the aqueous phase of an emulsion or mixture with non-aqueous material. It is understood that the invention is not to be limited to the specific details described. For example, tests with treating and control agents indicate that these celluloses are somewhat inert chemically and that all the normal and usual treating and control agents of the well drilling fluid and well controlling fluid arts may, after a simple test for lack of obvious adverse reactions, be employed without invention in our cellulose drilling and controlling fluids, and that with few, if any, exceptions they will be so employable. Our invention is, therefore, to be defined by the following claims:

We claim:

1. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble sulfonated cellulose derivative having the general formula:

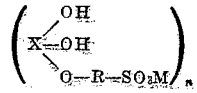

wherein X is the glucose residue ($C_6H_7O_2$); R is a radical selected from the group consisting of alkylene radicals wherein the alkylene group contains from 1 to 3 carbon atoms, alkylene-phenylene radicals where the alkylene portion of the group contains from 1 to 3 carbon atoms and is linked to the glucose residue through the alpha carbon atom, and the phenylene radical; $SO_3$ is a sulfonate group; M is of the group consisting of an alkali metal, an alkaline earth metal and an ammonium radical; $n$ is an integer; a sufficient number of the hydroxyl hydrogens being replaced to render the molecule water soluble; said water soluble sulfonated cellulose derivative being incorporated in said drilling mud in an amount sufficient to decrease the rate of filtration of fluid through said filter cake but insufficient to increase the viscosity of said drilling mud to such an extent as to render it uncirculatable and contacting said wall of said well with the resulting drilling mud to form said filter cake thereon.

2. A water base well drilling mud comprising in combination sufficient water to maintain the mud as a fluid, sufficient clayey material to form a filter cake on the wall of the well, and a water soluble sulfonated cellulose derivative having the general formula:

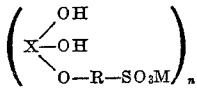

wherein X is the glucose residue ($C_6H_7O_2$); R is a radical selected from the group consisting of alkylene radicals wherein the alkylene group contains from 1 to 3 carbon atoms, alkylenephenylene radicals wherein the alkylene portion of the group contains from 1 to 3 carbon atoms and is linked to the glucose residue through the alpha carbon atom, and the phenylene radical; $SO_3$ is a sulfonate group; M is of a group consisting of an alkali metal, an alkaline earth metal or an amonium radical; n is an integer; a sufficient number of the hydroxyl hydrogens being replaced to render the molecule water soluble; said water soluble sulfonated cellulose derivative being incorporated in said drilling mud in an amount sufficient to reduce the water loss due to filtration through said filter cake but insufficient to increase the viscosity of said drilling mud to such an extent that it cannot be circulated.

3. A water base well drilling mud comprising an aqueous fluid mixture containing suspended inorganic solids which form a filter cake on the wall of the well, and a water soluble sulfonated derivative having the general formula:

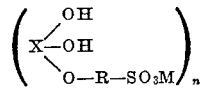

wherein X is the glucose residue ($C_6H_7O_2$); R is a radical selected from the group consisting of alkylene radicals wherein the alkylene group contains from 1 to 3 carbon atoms, alkylenephenylene radicals where the alkylene portion of the group contains from 1 to 3 carbon atoms and is linked to the glucose residue through the alpha carbon atom, and the phenylene radical; $SO_3$ is a sulfonate group; M is of a group consisting of an alkali metal, an alkaline earth metal or an ammonium radical; n is an integer; a sufficient number of the hydroxyl hydrogens being replaced to render the molecule water soluble; said water soluble sufonated cellulose derivative being incorporated in said drilling mud in an amount sufficient to reduce the water loss due to filtration through said filter cake but insufficient to increase the viscosity of said drilling mud to such an extent that it cannot be circulated.

4. A process for forming a filter cake, having a low rate of filtration of fluid therethrough, on the wall of a well by the deposition of colloidal clayey solids from a water base drilling mud circulated along said wall which comprises admixing with said driling mud and interacting therewith a water soluble inorganic salt of cellulosemethanesulfonic acid in an amount sufficient to decrease the rate of filtration of fluid through said filter cake but insufficient to increase the viscosity of said drilling mud to such an extent as to render it uncirculatable and contacting said wall of said well with the resulting drilling mud to form said filter cake thereon.

5. A water base well drilling mud comprising, in combination, sufficient water to maintain the mud as a fluid, sufficient clayey material to form a filter cake on the wall of the well, and a water soluble salt of cellulosemethanesulfonic acid in an amount sufficient to reduce the water loss due to filtration through said filter cake but insufficient to increase the viscosity of said drilling mud to such an extent that it cannot be circulated.

6. A water base well drilling mud comprising an aqueous fluid mixture containing suspended inorganic solids which form a filter cake on the wall of the well, and a water soluble salt of cellulosemethanesulfonic acid in an amount sufficient to reduce the water loss due to filtration through said filter cake but insufficient to increase the viscosity of said drilling mud to such an extent that it cannot be circulated.

7. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble salt of celluloseethanesulfonic acid in an amount sufficient to decrease the rate of filtration of fluid through said filter cake but insufficient to increase the viscosity of said drilling mud to such an extent as to render it uncirculatable and contacting said wall of said well with the resulting drilling mud to form said filter cake thereon.

8. A water base well drilling mud comprising, in combination, sufficient water to maintain the mud as a fluid, sufficient clayey material to form a filter cake on the wall of the well, and a water soluble salt of celluloseethanesulfonic acid in an amount sufficient to reduce the water loss due to filtration through said filter cake but insufficient to increase the viscosity of said drilling mud to such an extent that it cannot be circulated.

9. A water base well drilling mud comprising an aqueous fluid mixture containing suspended inorganic solids which form a filter cake on the wall of the well, and a water soluble salt of celluloseethanesulfonic acid in an amount sufficient to reduce the water loss due to filtration through said filter cake but insufficient to increase the viscosity of said drilling mud to such an extent that it cannot be circulated.

10. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble salt of cellulosemethylbenzenesulfonic acid in an amount sufficient to decrease the rate of filtration of fluid through said filter cake but insufficient to increase the viscosity of said drilling mud to such an extent as to render it uncirculatable and contacting said wall of said well with the resulting drilling mud to form said filter cake thereon.

11. A water base well drilling mud comprising, in combination, sufficient water to maintain the mud as a fluid, sufficient clayey material to form a filter cake on the wall of the well, and a water soluble salt of cellulosemethylbenzenesulfonic acid in an amount sufficient to reduce the water loss due to filtration through said filter cake but insufficient to increase the viscosity of said drilling mud to such an extent that it cannot be circulated.

12. A water base well drilling mud comprising an aqueous fluid mixture containing suspended inorganic solids which form a filter cake on the wall of the well, and a water soluble salt of cellulosemethylbenzenesulfonic acid in an amount sufficient to reduce the water loss due to filtration through said filter cake but insufficient to increase the viscosity of said drilling mud to such an extent that it cannot be circulated.

CARY R. WAGNER.
WILLIAM N. AXE.
CHESTER M. HIMEL.

REFERENCES CITED

The following references are of record in the file of this patent:

UNITED STATES PATENTS

| Number | Name | Date |
|---|---|---|
| 2,148,554 | Hentrich et al. | Feb. 28, 1939 |
| 2,425,768 | Wagner | Aug. 19, 1947 |
| 2,489,521 | Carlson | Nov. 29, 1949 |